United States Patent
Kwon

(10) Patent No.: US 7,667,810 B2
(45) Date of Patent: Feb. 23, 2010

(54) DISPLAY MODULE AND PORTABLE TERMINAL HAVING THE SAME

(75) Inventor: Oh-Il Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 596 days.

(21) Appl. No.: 11/458,509

(22) Filed: Jul. 19, 2006

(65) Prior Publication Data

US 2007/0019128 A1    Jan. 25, 2007

(30) Foreign Application Priority Data

Jul. 19, 2005    (KR) .................... 10-2005-0065361

(51) Int. Cl.
*G02F 1/1345* (2006.01)
(52) U.S. Cl. .................. 349/149; 349/150; 349/151; 349/152

(58) Field of Classification Search .......... 349/149–152
See application file for complete search history.

(56) References Cited

U.S. PATENT DOCUMENTS

2007/0019378 A1 *   1/2007   Kwon .................. 361/685

* cited by examiner

*Primary Examiner*—David Nelms
*Assistant Examiner*—Phu Vu
(74) *Attorney, Agent, or Firm*—Lee, Hong, Degerman, Kang & Waimey

(57) ABSTRACT

A mobile terminal comprising a frame, a flexible circuit wrapped around a portion of an edge of the frame, and a bracket located at an appropriate location between the frame and the flexible circuit along the edge of the frame. The bracket protects certain components of the flexible circuit during assembly of the mobile terminal and supports the frame during use of the mobile terminal.

20 Claims, 5 Drawing Sheets

DISPLAY MODULE AND PORTABLE TERMINAL HAVING THE SAME

CROSS-REFERENCE TO RELATED APPLICATION

The present disclosure relates to subject matter contained in priority Korean Application No. 2005-0065361, filed on Jul. 19, 2005, which is herein expressly incorporated by reference in its entirely.

BACKGROUND

1. Field of the Invention

The present invention relates to a display module and a portable terminal having the same, and more particularly, to a display module having a thin thickness and a reinforcing member to minimize damage thereto, and a portable terminal having the same.

2. Description of the Background Art

FIG. 1 is a perspective view showing a front surface of a display module in accordance with the related art, and FIG. 2 is a perspective view showing a rear surface of the display module in accordance with the related art.

The related art display module 102 comprises a supporting frame 110 mounted at a case of a portable terminal; a first display 112 to display information and being mounted at one surface of the supporting frame 110 and installed at an inner surface of a folder thus to be exposed when the portable terminal is opened; and a second display 114 to display information and being mounted at another surface of the supporting frame 110 and installed at an outer surface of the folder thus to be exposed outwardly when the portable terminal is closed.

A flexible printed circuit board 116 electrically connected to the first display 112 and the second display 114 is mounted at one side of the supporting frame 110.

The flexible printed circuit board 116 is centered along an edge of the supporting frame 110. One side of the flexible printed circuit board 116 is positioned at one side of the supporting frame 110 thus to be electrically connected to the first display 112, and another side of the flexible printed circuit board 116 is positioned at another side of the supporting frame 110 thus to be electrically connected to the second display 114.

A display driving device 120 for driving the first display 112 and the second display 114 is installed at one side of the flexible printed circuit board 116, and a connector 122 connected to a main printed circuit board mounted at a terminal body is mounted at another side of the flexible printed circuit board 116. To improve portability and user convenience, the overall thickness of the portable terminal should be as thin or slim as possible. One way to achieve this is to reduce the size or thickness of the entire display module or portions thereof.

During a manufacturing process of the related art, some physical pressure needs to be applied on the connector when connecting the main printed circuit board thereto. But, if the related art display module is made thinner, such assembly procedure increases the chance that various components may be damaged during assembly.

Also, if the related art display module is made thinner, the display screen or at least some portion of the display module itself may be more prone to damage after prolonged use, if the terminal is dropped or if other physical force or impacts are applied thereto.

SUMMARY

One aspect of the present invention is the recognition by the present inventors of the related art problems identified above. Based upon such recognition, the present invention has been developed.

The present invention may provide a display module capable of reducing a thickness of a portable (mobile) terminal, minimizing damage thereto due to external impacts, providing a reinforcing member at a supporting frame to minimize damage to components installed at the display when a connector is connected to a main printed circuit board during manufacturing, and a portable (mobile) terminal having the same.

The present invention may provide a display module, comprising: a supporting frame; a display mounted at the supporting frame for displaying information; and a reinforcing member installed at the supporting frame for preventing the supporting frame from being distorted thereby preventing a damage of the display due to an external impact.

The reinforcing member may be installed at one side of the supporting frame in a width direction.

A reinforcing member mounting portion for mounting the reinforcing member may have a concave shape at the supporting frame with a thickness corresponding to a thickness of the reinforcing member.

The reinforcing member may be fixed to the reinforcing member mounting portion by an adhesion.

The reinforcing member may be provided with a bent portion perpendicularly bent in a longitudinal direction thus to be arranged at a side surface of the supporting frame in a width direction.

The display may include a first display mounted at one surface of the supporting frame, and a second display mounted at another surface of the supporting frame. The first display and the second display are electrically connected to each other by a flexible printed circuit board.

A ground connection line for a ground connection is connected to one side of the flexible printed circuit board, and a ground port is connected to the end of the ground connection line. The ground port may be arranged at the reinforcing member mounting portion for mounting the reinforcing member thus to contact the reinforcing member.

A display driving device is mounted at one side of the flexible printed circuit board, and a connector is mounted at another side of the flexible printed circuit board. The reinforcing member is installed between the connector and the display driving device.

The present invention may also provide a portable terminal, comprising: a first body; a second body mounted to the first body to allow opening and closing thereof; and a display module mounted at the first body, wherein the display module includes a supporting frame mounted in the first body; a display mounted at the supporting frame and arranged to be exposed outside the first body; and a reinforcing member installed at the supporting frame for preventing the supporting frame from being distorted thereby preventing a damage of the display due to an external impact.

BRIEF DESCRIPTION OF THE DRAWINGS

The accompanying drawings, which are included to provide a further understanding of the invention and are incorporated in and constitute a part of this specification, illustrate some embodiments of the invention and together with the description serve to explain the principles of the invention.

In the drawings.

DETAILED DESCRIPTION

The present invention relates to an improved structure for a display unit that is part of an electronic device (hereafter referred as a portable terminal, which may include a mobile phone, a wireless communication device, and the like). Hereinafter, a folder type portable terminal according to the present invention will be explained in more detail merely for the sake of explanation. Those skilled in the art can clearly understand that the features of the present invention are applicable to various other configurations for the portable terminal (e.g., slider-type, bar-type, swivel-type, etc.).

Figure 1:
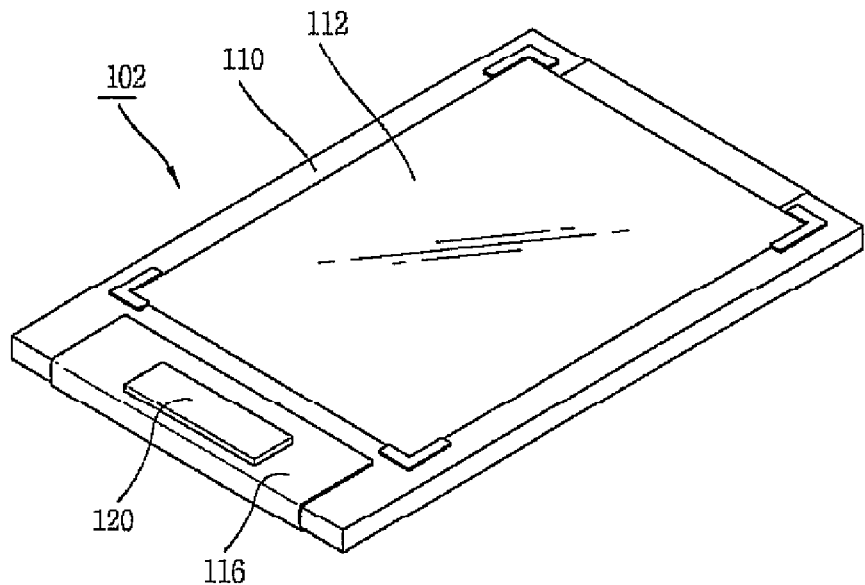
FIG. 1 is a perspective view showing one surface of a display module in accordance with the related art.
Figure 2:
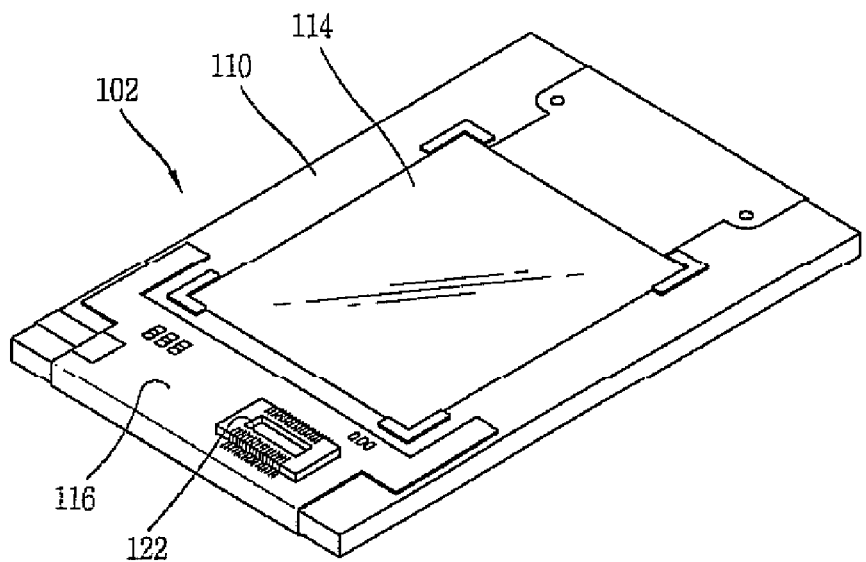
FIG. 2 is a perspective view showing another surface of a display module in accordance with the related art.
Figure 3:
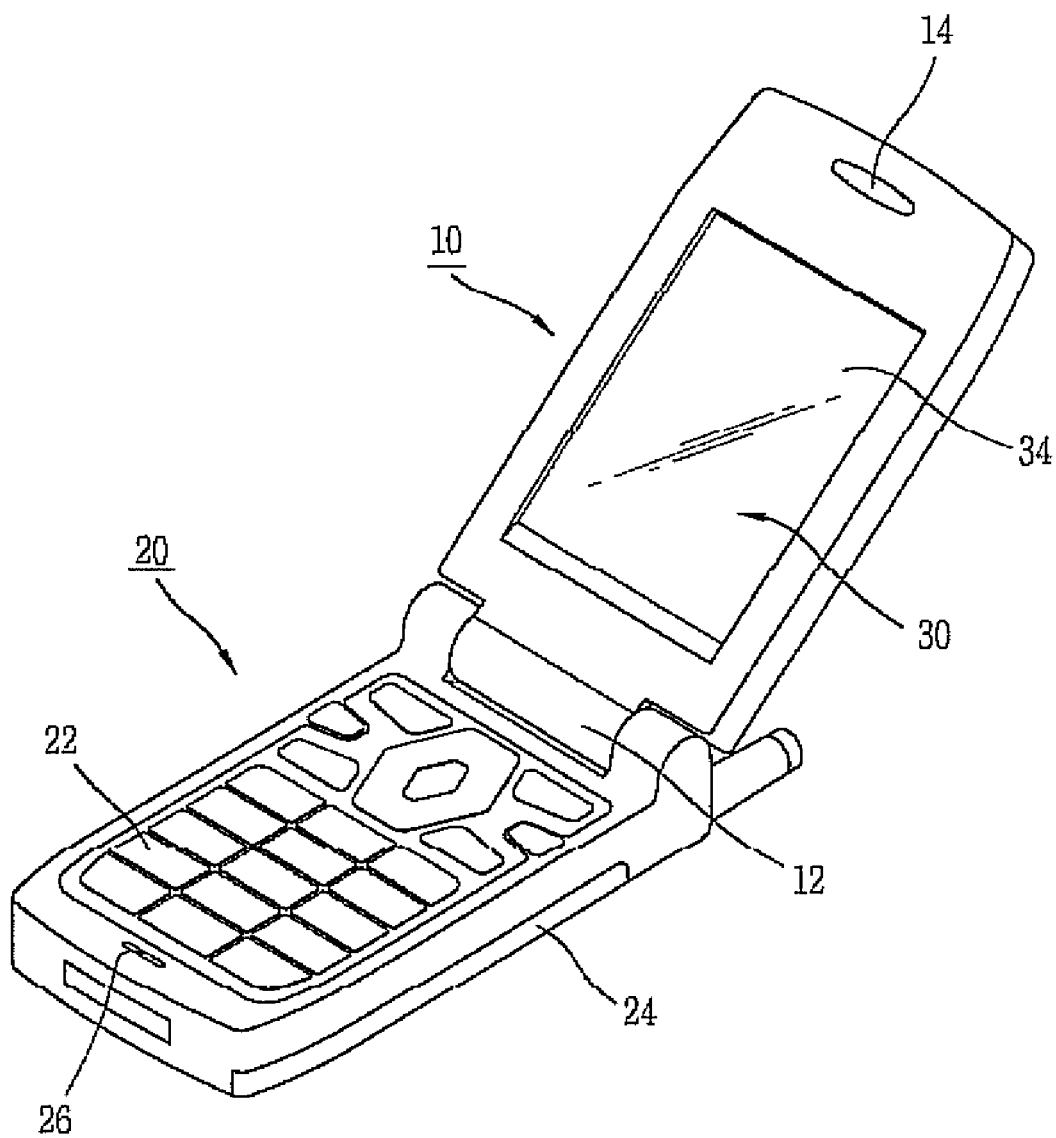
FIG. 3 is a perspective view showing a portable terminal according to a first embodiment of the present invention.
Figure 4:
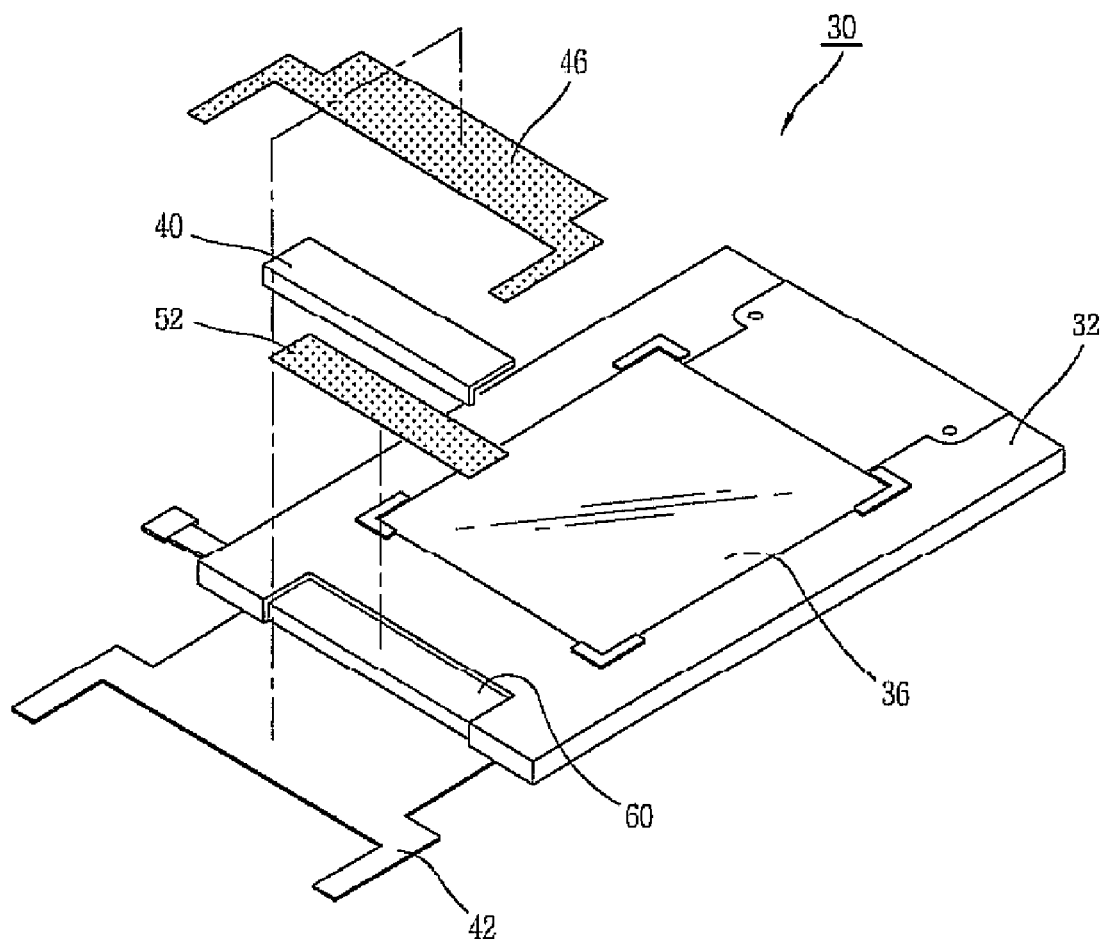
FIG. 4 is a disassembled perspective view showing an exemplary display module according to the present invention.
Figure 5:
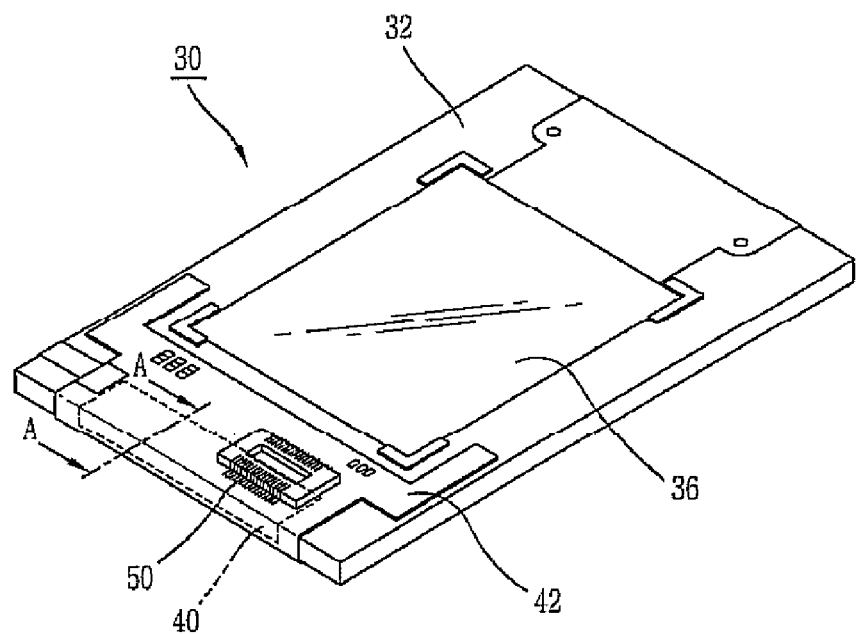
FIG. 5 is a perspective view of an exemplary display module according to the present invention.
Figure 6:
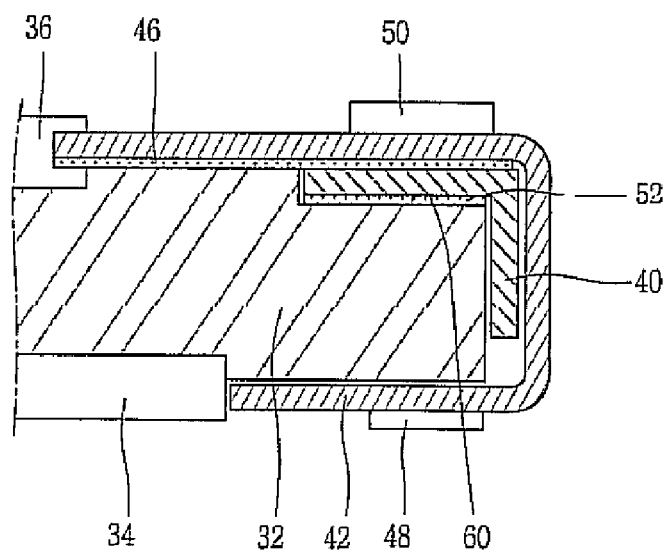
FIG. 6 is a sectional view taken along line 'A-A' in FIG. 5.

FIG. 3 is a perspective view showing a portable terminal according to a first embodiment of the present invention, FIG. 4 is a disassembled perspective view showing a display module according to the present invention, FIG. 5 is a perspective view of the display module according to the present invention, and FIG. 6 is a sectional view taken along line 'A-A' in FIG. 5.

Referring to FIG. 3, the portable terminal according to a first embodiment of the present invention comprises a first body 10 (first housing, folder portion, etc.) having a display module 30 (with a display, screen, LCD, etc.) for displaying information thereon; and a second body 20 (second housing, main body portion, etc.) rotatably connected (e.g., foldable) to the first body 10 by a hinge mechanism, having a key pad 22 (or other input device, such as a touch-pad, touch-sensitive screen, etc.) for inputting information at a front surface thereof, and having a battery 24 (or other power supply or source) at a rear surface thereof.

The features of the present invention can be applied not only to the folder type having the first body 10 and the second body 20 rotatably connected (i.e., foldable relative to) to each other, but also a bar type having a single unit or linear body, a slider type with a first body and a second body being slidably connected to each other, a swivel type with a first body and a second body being swingably connected to each other, etc.

A speaker 14 (or other audio output means) for generating sound is mounted at the first body 10, and a microphone 26 (or other sound pick-up device) for converting sound wave signals into electrical signals is mounted at the second body 20.

Referring to FIG. 4, the display module 30 may comprise a supporting frame 32 fixed at the first body 10, displays 34 and 36 mounted on a surface of the supporting frame 32, and a reinforcing member 40 installed at the supporting frame 32 for reinforcing a mechanical strength (i.e., structural integrity) of the supporting frame 32 to thereby minimize damage to the displays 34 and 36 (and/or other components) during assembly and use.

The supporting frame 32 may be formed of a synthetic resin, and may be relatively thin (e.g., approximately less than 3.2 mm) to allow the portable terminal to have a minimal overall thickness.

The displays may include a first display 34 mounted at one surface of the supporting frame 32 and installed at an inner surface of the first body 10 for displaying information when the first body 10 is opened, and a second display 36 mounted at another surface of the supporting frame 32 and installed at an outer surface of the first body 10 so as to be exposed for displaying information.

The first display 34 and the second display 36 may respectively have a relatively thin thickness (approximately 0.95~1 mm). The first display 34 (i.e., internal screen) may have a larger size than the second display 36 (i.e., external screen).

A flexible printed circuit board (PCB) 42 (or other type of flexible circuit, electrical connector, etc.) for electrically connecting the first display 34 and the second display 36 may be mounted at one side of the supporting frame 32. The flexible printed circuit board 42 may be bent at the edge of the supporting frame 32, with one end of the flexible printed circuit board 42 being connected to one surface of the supporting frame 32 thus to be electrically connected to the first display 34, and another end of the flexible printed circuit board 42 being connected to another surface of the supporting frame 32 thus to be electrically connected to the second display 36. The flexible printed circuit board 42 may be adhered to the supporting frame 32 by a two-sided adhesion tape 46 or by any appropriate means of attachment, such as an adhesive.

A connector 50 (a port, terminal connection, etc.), electrically connected to a main printed circuit board (and/or other electronic components or elements) in the second body 20, may be mounted at one side of the flexible printed circuit board 42.

A display driving device 48 (a driver circuit, controller, etc.) for driving the first display 34 and the second display 36 may be installed at another side of the flexible printed circuit board 42.

The reinforcing member 40 (a bracket, a support band, etc.) may be installed along one edge of the supporting frame 32 in a width direction to provide adequate structural support for the supporting frame 32.

A reinforcing member mounting portion 60 (a shoulder, ridge, etc.) for mounting the reinforcing member 40 may be formed in a concave manner at the supporting frame 32 such that the thickness of the supporting frame 32 need not be increased when the reinforcing member 40 is mounted at the supporting frame 32.

The reinforcing member 40 may be formed of a metal, a composite, and/or any other material that provides the appropriate strength for support, while allowing the display module 30 to have minimal thickness. The reinforcing member 40 may be an elongated plate being bent along its length such that at least portions of a top surface and also a side surface of the supporting frame 32 are covered.

The reinforcing member 40 may be fixed to the reinforcing member mounting portion 60 by adhesion (e.g., two-sided adhesion tape 52, other glue or adhesive material, etc.).

Also, a portion of the reinforcing member 40 may have at least one indentation or through hole, which may accommodate an appropriate means of adhesion or attachment. For example, the reinforcing member 40 may have a portion of at least one side with multiple perforations (openings) in which adhesive material may be located. Alternatively or additionally, a portion of the mounting portion 60 may have at least one indentation or through hole, which may accommodate an adhesive (or attachment) means.

Here, it can be understood that one or more through holes in the reinforcing member 40 with adhesive material existing therein may allow sufficient attachment with both the frame 30 (i.e., via the mounting portion 60) and the flexible PCB 42 at each respective side of the reinforcing member 40, while providing minimal thickness.

Such structure of the reinforcing member 40, the mounting portion 60, or both may further minimize the overall thickness while allowing proper attachment of the reinforcing member 40 to the mounting portion 60.

Also, the openings or through hole may reduce the weight of the reinforcing member 40, which may be useful if the material being used for the reinforcing member 40 is relatively heavy.

The concave depth of the reinforcing member 60 may match a total thickness (approximately 0.25 mm) of both the reinforcing member 40 (approximately 0.15 mm) and the two-surface adhesion tape 52 (approximately 0.1 mm). This provides a minimal thickness for the supporting frame 32 after the reinforcing member 40 is mounted thereto.

The reinforcing member 40 may be mounted at an inner side of the flexible printed circuit board 42, and may be installed between the connector 50 and the display driving device 48. Since the reinforcing member 40 is installed between the connector 50 and the display driving device 48, the physical force applied to the connector 50 during connection with the main printed circuit board to the display driving device 48 has little adverse effect, which thus minimizes any possible damage to the display driving device 48 and/or other components.

In other words, the particular location of the reinforcing member 40 acts as a sufficient buffer (i.e., cushion, barrier, etc.) to allow an assembly procedure for the connector 50 to be performed more safely and securely. Together with the fact that the reinforcing member 40 is made of a material having an appropriate strength (integrity), the display module 30 can have minimal thickness with a structure that is durable during assembly and usage.

Since the reinforcing member 40 may be installed at (attached to) the supporting frame 32 in a width direction, the supporting frame 32 cannot easily be bent or distorted, and thus damage of the displays 34 and 36 due to external impacts can be minimized. Furthermore, since the reinforcing member 40 may be installed between the connector 50 and the display driving device 48, the display driving device 48 will not be damaged when the connector 50 is connected to the main printed circuit board.

Figure 7:
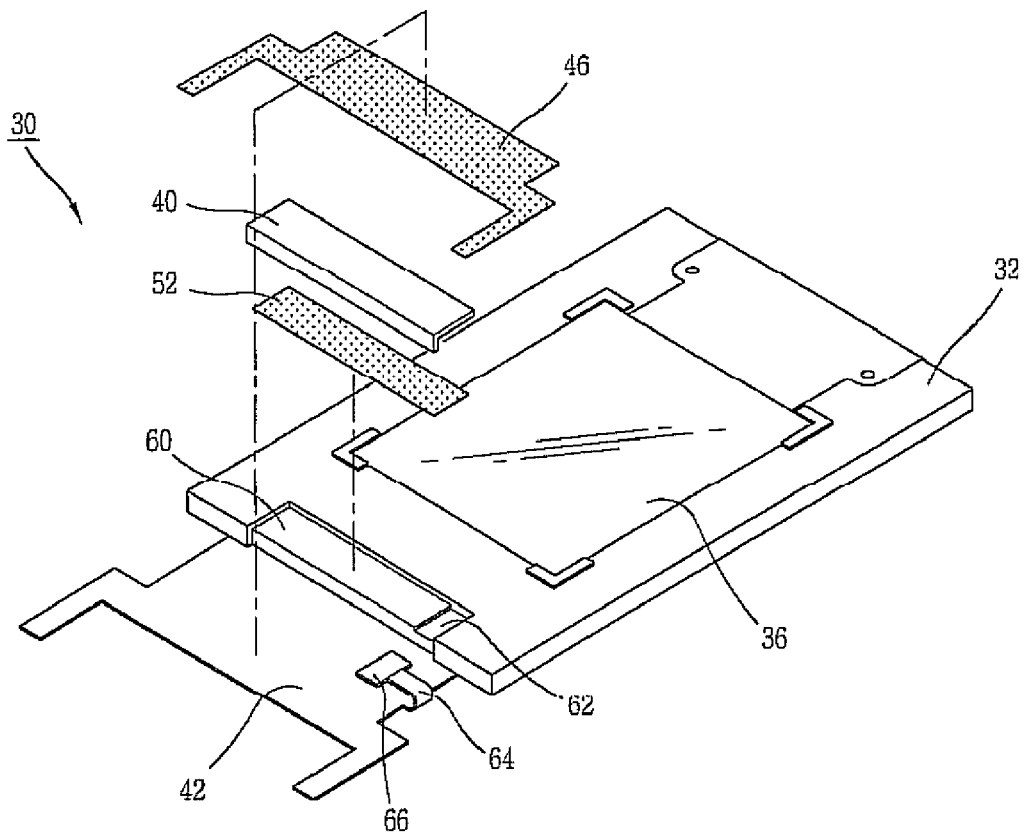
FIG. 7 is a disassembled perspective view showing an exemplary display module according to a second embodiment of the present invention.
Figure 8:
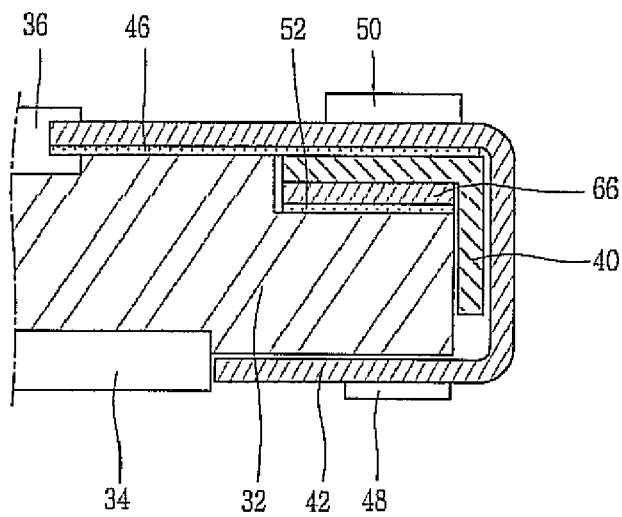
FIG. 8 is a partial sectional view of an exemplary display module according to a second embodiment of the present invention.

FIG. 7 is a disassembled perspective view showing a display module according to a second embodiment of the present invention, and FIG. 8 is a partial sectional view of the display module according to a second embodiment of the present invention.

The display module according to the second embodiment of the present invention may include a supporting frame 32 fixed in the first body 10; a first display 34 and a second display 36 mounted at a surface of the supporting frame 32 for displaying information; a reinforcing member 40 installed at the supporting frame 32 for reinforcing the intensity of the supporting frame 32 thereby preventing a damage of the displays 34 and 36 due to an external impact; a flexible printed circuit board 42 for electrically connecting the first display 34 and the second display 36; and a ground port 66 (or other electrical connector or terminal) for ground-connecting between the reinforcing member 40 and the first display 34 and the second display 36.

The supporting frame 32 and the reinforcing member 40 may have the same structures as those of the supporting frame and the reinforcing member 40 aforementioned in the first embodiment, and thus their explanation will be omitted.

A ground connection line 64 (or other conductive wire) is connected to one side of the flexible printed circuit board 42, and the ground port 66 is provided at the end of the ground connection line 64. The ground port 66 may be arranged at the reinforcing member mounting portion 60 for mounting the reinforcing member 40 thus to contact the reinforcing member 40, thereby providing a ground connection between the reinforcing member 40 and the first and second displays 34 and 36.

A ground port mounting portion 62 for mounting the ground port 66 (or other region to receive or attach the ground port 66) may be formed in a concave manner at the reinforcing member mounting portion 60.

In the display module according to the second embodiment of the present invention, the first display 34 and the second display 36 are grounded to the reinforcing member 40 formed of a metal material by the ground port 66.

As can be understood by referring to the Figures, the present invention provides a mobile terminal comprising: a frame; a flexible circuit wrapped around a portion of an edge of the frame, and a bracket located at an appropriate location between the frame and the flexible circuit along the edge of the frame to protect certain components of the flexible circuit during assembly of the mobile terminal and to support the frame during use of the mobile terminal.

The bracket may be an elongated plate having a lengthwise bent portion, such that a profile of the bracket matches the edge of the frame. The frame may have an elongated notch that receives a portion of the bracket such that a part of an outer surface of the bracket and an outer surface of the frame are flush. The bracket may be attached with the frame by an adhesive material, or may be attached with the flexible circuit by an adhesive material, or both. The bracket, the frame or both may comprise one or more indentations or openings that accommodate the adhesive material therein. The flexible circuit may have a display driver and a connector thereon being located in an opposing manner with the flexible circuit wrapped around the edge of the frame, and the bracket providing protection to the display driver when a physical connection is attached to the connector. The bracket may be made of conductive material or comprises a conductive portion that allows grounding. The present invention may further comprise: one or more display screens respectively attached to the frame for a folder portion of the terminal with the flexible circuit providing electrical connections for the display screens, whereby the edge of the frame supported by the bracket is adjacent to a hinge mechanism for the folder portion that can be opened and closed.

In the display module according to the present invention, the reinforcing member may be installed at the supporting frame in a width direction thus to prevent the supporting frame from being distorted, thereby minimizing any damage of the first display and the second display due to external impacts.

Furthermore, since the reinforcing member may be installed between the connector and the display driving device, the display driving device is unlikely to be damaged when the connector is connected to the main printed circuit board during assembly.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A display module for a mobile terminal, comprising:
a supporting frame;
a display mounted at the supporting frame for displaying information; and
a reinforcing member installed at the supporting frame for preventing the supporting frame from being distorted, thereby minimizing damage to the display due to an external impact.

2. The display module of claim 1, wherein the reinforcing member is installed at one side of the supporting frame in a width direction.

3. The display module of claim 1, wherein a reinforcing member mounting portion for mounting the reinforcing member is formed in a concave manner at the supporting frame with a depth corresponding to a thickness of the reinforcing member.

4. The display module of claim 3, wherein the reinforcing member is fixed to the reinforcing member mounting portion by adhesion.

5. The display module of claim 1, wherein the reinforcing member is provided with a bent portion formed in a longitudinal direction, and is arranged at a side surface of the supporting frame in a width direction.

6. The display module of claim 1, wherein the reinforcing member is formed of a metal material.

7. The display module of claim 1, wherein the display includes a first display mounted at one surface of the supporting frame and a second display mounted at another surface of the supporting frame, and the first display and the second display are electrically connected to each other by a flexible printed circuit board.

8. The display module of claim 7, wherein the first display, the second display, and the reinforcing member are grounded to one another.

9. The display module of claim 8, wherein a ground connection line for a ground connection is connected to one side of the flexible printed circuit board, a ground port is connected to an end of the ground connection line, and the ground port is arranged at the reinforcing member mounting portion for mounting the reinforcing member thus to contact the reinforcing member.

10. The display module of claim 9, wherein a ground port mounting portion for mounting the ground port is formed at the reinforcing member mounting portion.

11. The display module of claim 7, wherein a display driving device is mounted at one side of the flexible printed circuit board, a connector is mounted at another side of the flexible printed circuit board, and the reinforcing member is installed between the connector and the display driving device.

12. A portable terminal, comprising:
a first body;
a second body mounted at the first body to allow opening and closing thereof; and
a display module mounted at the first body, wherein the display module includes:
a supporting frame mounted in the first body;
a display mounted at the supporting frame and arranged to be exposed from the first body; and
a reinforcing member installed at the supporting frame for preventing the supporting frame from being distorted, thereby minimizing damage of the display due to an external impact.

13. A mobile terminal comprising:
is a frame;
a flexible circuit wrapped around a portion of an edge of the frame; and
a bracket located at an appropriate location between the frame and the flexible circuit along the edge of the frame to protect certain components of the flexible circuit during assembly of the mobile terminal and to support the frame during use of the mobile terminal.

14. The terminal of claim 13, wherein the bracket is an elongated plate having a lengthwise bent portion, such that a profile of the bracket matches the edge of the frame.

15. The terminal of claim 14, wherein the frame has an elongated notch that receives a portion of the bracket such that a part of an outer surface of the bracket and an outer surface of the frame are flush.

16. The terminal of claim 15, wherein the bracket is attached with the frame by an adhesive material, or is attached with the flexible circuit by an adhesive material, or both.

17. The terminal of claim 16, wherein the bracket, the frame or both comprises one or more indentations or openings that accommodate the adhesive material therein.

18. The terminal of claim 16, wherein the flexible circuit has a display driver and a connector thereon being located in an opposing manner with the flexible circuit wrapped around the edge of the frame, and the bracket providing protection to the display driver when a physical connection is attached to the connector.

19. The terminal of claim 18, the bracket is made of conductive material or comprises a conductive portion that allows grounding.

20. The terminal of claim 19, further comprising:
one or more display screens respectively attached to the frame for a folder portion of the terminal with the flexible circuit providing electrical connections for the display screens,
whereby the edge of the frame supported by the bracket is adjacent to a hinge mechanism for the folder portion that can be opened and closed.

* * * * *